United States Patent [19]

Iwasaki

[11] Patent Number: 6,046,559
[45] Date of Patent: *Apr. 4, 2000

[54] MOTOR CONTROL METHOD AND DISK UNIT

[75] Inventor: Masaaki Iwasaki, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/980,327

[22] Filed: Nov. 26, 1997

[30] Foreign Application Priority Data

May 29, 1997 [JP] Japan .................................. 9-140441

[51] Int. Cl.⁷ ...................................................... H02K 7/10
[52] U.S. Cl. ............................ 318/364; 318/373; 318/374
[58] Field of Search ...................... 360/69, 135; 318/362, 318/375, 377, 470, 471, 363, 364, 366, 367, 739, 741, 742, 763, 764, 467, 373, 374

[56] References Cited

U.S. PATENT DOCUMENTS

| | | | |
|---|---|---|---|
| 3,843,912 | 10/1974 | Anderson | 318/258 |
| 3,895,277 | 7/1975 | Klump | 318/269 |
| 3,995,204 | 11/1976 | Konrad et al. | 318/367 |
| 4,087,078 | 5/1978 | Joraku et al. | 254/173 R |
| 4,549,120 | 10/1985 | Banno et al. | 318/254 |
| 4,833,378 | 5/1989 | Furue et al. | 318/374 |
| 4,926,101 | 5/1990 | Enomoto et al. | 318/374 |
| 5,132,598 | 7/1992 | Albanesius et al. | 318/285 |
| 5,172,038 | 12/1992 | Page et al. | 318/373 |
| 5,311,107 | 5/1994 | Shimegi et al. | 318/369 |
| 5,565,760 | 10/1996 | Ball et al. | 322/23 |
| 5,583,412 | 12/1996 | Nielsen | 318/811 |
| 5,616,997 | 4/1997 | Jackson et al. | 318/467 |

FOREIGN PATENT DOCUMENTS

| | | |
|---|---|---|
| 56-22254 | 3/1981 | Japan . |
| 62-140282 | 6/1987 | Japan . |
| 1-243864 | 9/1989 | Japan . |
| 1-288874 | 11/1989 | Japan . |
| 2-257456 | 10/1990 | Japan . |
| 3-160476 | 7/1991 | Japan . |

*Primary Examiner*—Robert E. Nappi
*Assistant Examiner*—Rita Leykin
*Attorney, Agent, or Firm*—Greer, Burns & Crain, Ltd.

[57] ABSTRACT

A motor control method stops rotation of a motor which rotates in a forward direction by applying a brake signal for rotating the motor in a reverse direction. The motor control method detects a power supply voltage, and corrects a brake signal applying time for which the brake signal is applied to the motor depending on the detected power supply voltage.

20 Claims, 11 Drawing Sheets

MOTOR CONTROL METHOD AND DISK UNIT

BACKGROUND OF THE INVENTION

The present invention generally relates to motor control methods and disk units, and more particularly to a motor control method for stopping rotation of a motor by applying to the motor which is rotating in a forward direction a brake signal which rotates the motor in a reverse direction, and to a disk unit which employs such a motor control method.

As methods of stopping the rotation of the motor, there is a short-circuit brake method, a reverse rotation brake method and the like. The short-circuit brake method stops the rotation of the motor by short-circuiting motor windings. This short-circuit brake method is simple, but it takes a relatively long time until the motor stops completely. On the other hand, the reverse rotation brake method stops the rotation of the motor by applying to the motor which is rotating in the forward direction a brake signal which rotates the motor in the reverse direction. Hence, the reverse rotation brake method can stop the motor completely within a short time.

In disk units such as an optical disk unit which is designed so that a disk is loaded into and unloaded from the disk unit, an eject operation is carried out when unloading the disk from the disk unit. When this eject operation is carried out, a spindle motor which rotates the disk is stopped, and the disk is ejected from the disk unit in a state where the disk has completely stopped rotating, so as to protect the disk. When the operation characteristic of the disk unit is taken into consideration, it is desirable that the disk is ejected as quickly as possible from the disk unit when the eject operation is carried out. For this reason, it is desirable in the case of the disk unit to employ the reverse rotation brake method which can stop the rotation of the spindle motor within a short time.

When controlling the rotation of the spindle motor, this rotation control is greatly affected by environmental conditions of the spindle motor, that is, the environment in which the disk unit is used. When a constant voltage drive type integrated circuit (IC) which is popularly used is employed to apply a current to the spindle motor, this current depends upon a power supply voltage of the disk unit, and the current varies similarly to the power supply voltage when the power supply voltage varies. In addition, a friction of a shaft of the spindle motor depends upon a temperature within the disk unit due to a temperature characteristic or the like of a lubricant coated on the shaft portion, and thus, the friction of the shaft varies as the temperature varies.

Accordingly, even if an optimum value of a brake time which is obtained with respect to the spindle motor under conditions in which the power supply voltage does not vary is used, the spindle motor which is rotating in the forward direction will start rotating in the reverse direction before the brake time ends when the power supply voltage has an upper limit value within a tolerable range and the constant voltage drive type IC is employed. In this case, the spindle motor will continue to rotate in the reverse direction for a while due to inertia even after the brake time ends. On the other hand, when the power supply voltage has a lower limit value within the tolerable range, the spindle motor which rotates in the forward direction will continue to rotate in the forward direction for a while even after the brake time ends. In addition, even if the optimum value of the brake time which is obtained with respect to the spindle motor under room temperature is used, the spindle motor will start rotating in the reverse direction before the brake time ends under low temperature conditions, and the spindle motor will continue to rotate in the reverse direction for a while due to inertia even after the brake time ends. On the other hand, when the power supply voltage has the lower limit value within the tolerable range, the spindle motor which is rotating in the forward direction will continue to rotate in the forward direction for a while under high temperature conditions even after the brake time ends.

In order to prevent rotation of the spindle motor due to inertia after the brake time ends, it is conceivable to provide a motor rotation detection means for detecting the complete stop of the spindle motor. However, in this conceivable case, it becomes necessary to provide Hall elements or the like as the motor rotation detection means, in addition to a motor control circuit, and a control system for the spindle motor would become complex and expensive.

Conventionally, the motor control method does not take into consideration the environment in which the motor is used. For this reason, if the power supply voltage or the temperature varies, there was a problem in that the motor will not come to a complete stop even after the brake time ends.

In addition, although it is conceivable to provide a motor rotation detection means for detecting the complete stop of the motor, the control system for the motor would become complex and expensive. Hence, it is desirable to accurately and positively stop the motor within a short time without the need to provide a motor rotation detection means.

It is conceivable to generate a pulse signal when the spindle motor rotates by a relatively simple circuit within a control circuit which rotates the spindle motor by applying a driving current having three phases, for example. This pulse signal can be generated by detecting a counterelectromotive voltage of the spindle motor and binarizing the counterelectromotive voltage waveform. However, when a ratio L/R between an inductance L and a resistance R of the coil of the spindle motor is large, the pulse signal will become irregular as the rotational speed of the spindle motor becomes small. But since the magnetic force must be set high due to the small capacity when the start time is to be reduced particularly in the case of a thin type spindle motor, this ratio L/R becomes a relatively large value.

Figure 1:
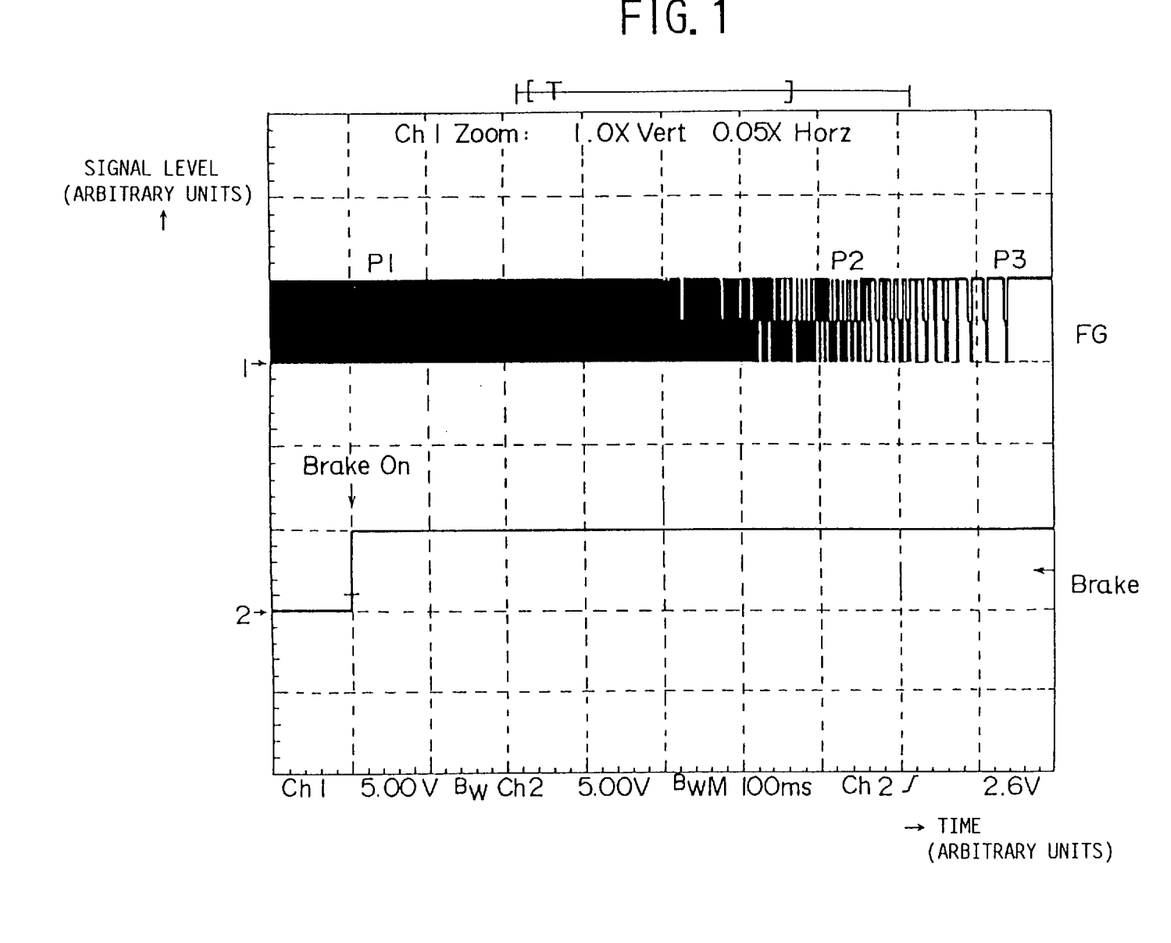
FIG. 1 is a diagram showing the signal waveforms of a pulse signal P and a signal B which instructs the start of the braking.
Figure 2:
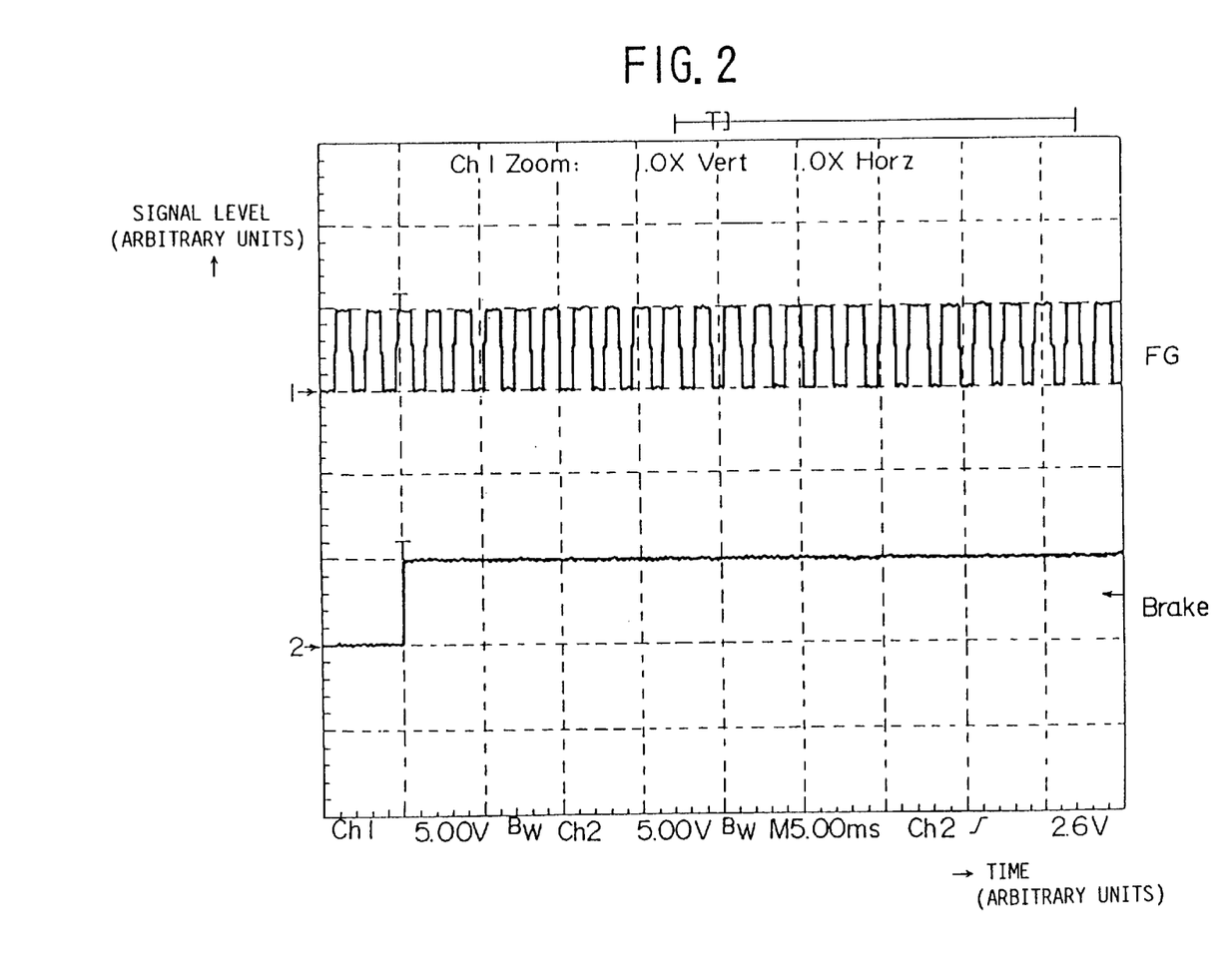
FIG. 2 is a diagram showing the signal waveform of the pulse signal P at a portion P1 shown in FIG. 1 on an enlarged scale.

FIG. 1 is a diagram showing the signal waveforms of the pulse signal P described above and a signal B which instructs the start of the braking. In addition, FIGS. 2, 3 and 4 respectively are diagrams showing the signal waveforms of the pulse signal P at portions P1, P2 and P3 shown in FIG. 1 on an enlarged scale. In FIGS. 1 through 4, the ordinate indicates the signal level in arbitrary units, and the abscissa indicates the time in arbitrary units. It may be seen from FIG. 3 that the pulse signal P becomes irregular particularly from a portion D in FIG. 3 where the rotational speed of the spindle motor becomes small.

Figure 3:
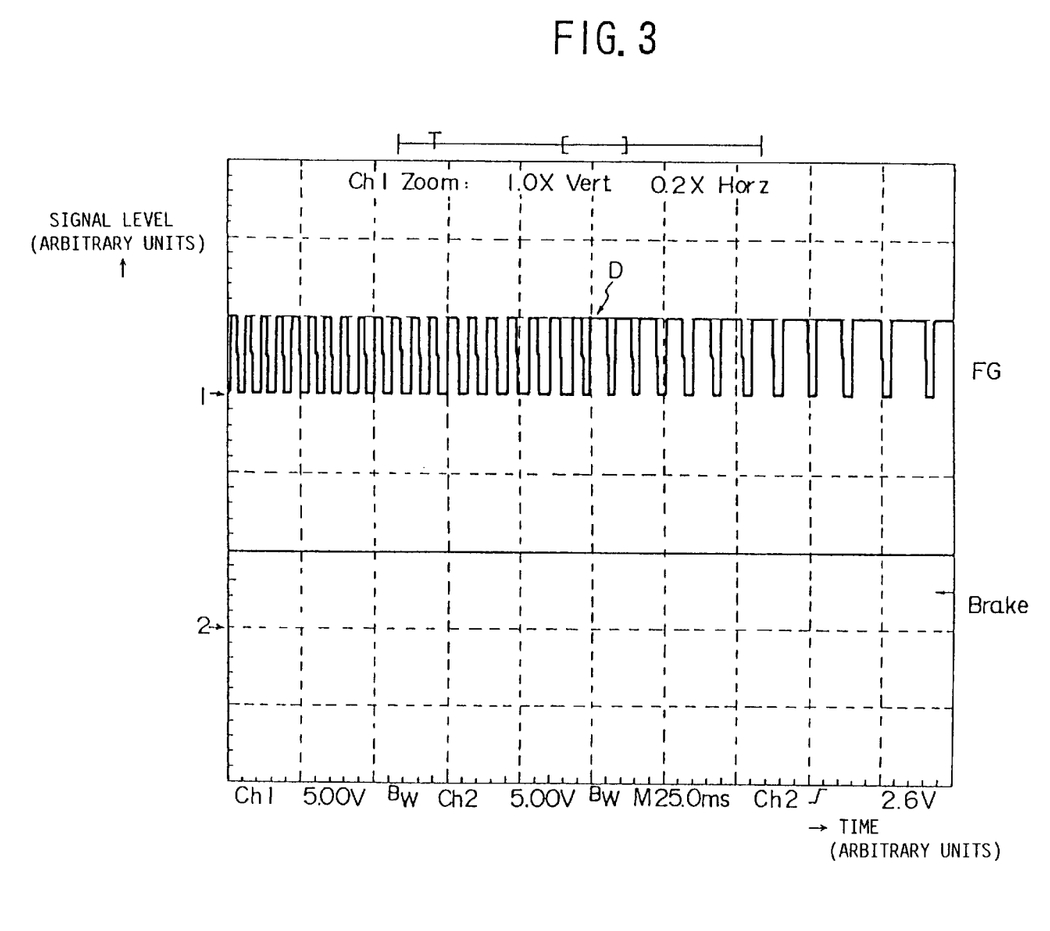
FIG. 3 is a diagram showing the signal waveform of the pulse signal P at a portion P2 shown in FIG. 1 on an enlarged scale.
Figure 4:
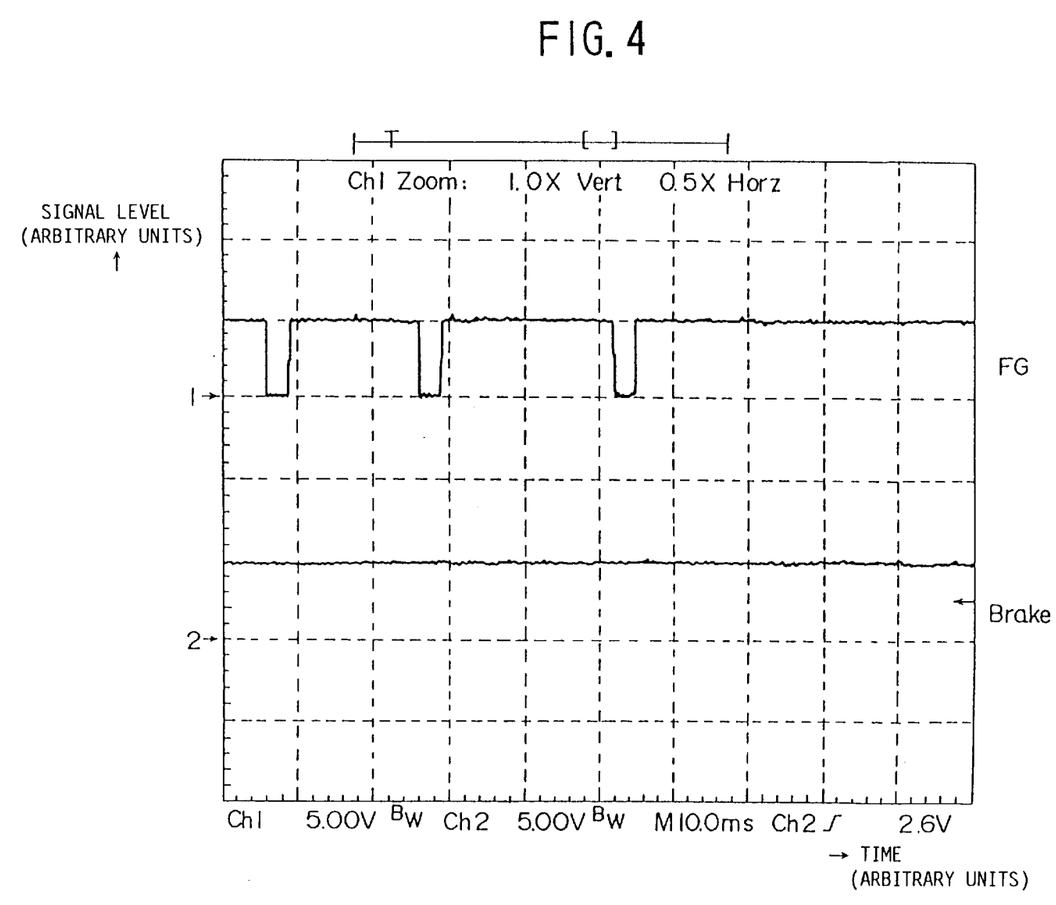
FIG. 4 is a diagram showing the signal waveform of the pulse signal P at a portion P3 shown in FIG. 1 on an enlarged scale.

Therefore, although it is conceivable to detect the stop of the spindle motor by use of the pulse signal P described above, it may be seen from the irregularity generated in the pulse signal P at the low rotational speeds of the spindle motor that this conceivable method is not practical.

SUMMARY OF THE INVENTION

Accordingly, it is a general object of the present invention to provide a novel and useful motor control method and disk unit, in which the problems described above are eliminated.

Another and more specific object of the present invention is to provide a motor control method and disk unit which can accurately and positively stop rotation of a motor within a short time, regardless of an environment in which the motor is used, and without the need to provide a motor rotation detection means.

Still another object of the present invention is to provide a motor control method for stopping rotation of a motor which rotates in a forward direction by applying a brake signal for rotating the motor in a reverse direction, comprising the steps of (a) detecting a power supply voltage, and (b) correcting a brake signal applying time for which the brake signal is applied to the motor depending on the power supply voltage detected by the step (a). According to the motor control method of the present invention, it is always possible to positively and accurately stop the rotation of the motor regardless of a variation of the power supply voltage.

A further object of the present invention is to provide a disk unit comprising a motor rotating a disk, a motor control circuit stopping rotation of the motor rotating in a forward direction when applied with a brake signal for rotating the motor in a reverse direction, and voltage detection means for detecting a power supply voltage, where the motor control circuit includes correction means for correcting a brake signal applying time for which the brake signal is applied to the motor depending on the power supply voltage detected by the voltage detection means. According to the disk unit of the present invention, it is always possible to positively and accurately stop the rotation of the motor regardless of a variation of the power supply voltage.

Another object of the present invention is to provide a motor control method for stopping rotation of a motor which rotates in a forward direction by applying a brake signal for rotating the motor in a reverse direction, comprising the steps of (a) detecting a temperature in a unit which includes the motor, (b) correcting a brake signal applying time for which the brake signal is applied to the motor depending on the temperature detected by the step (a), and (c) limiting an upper limit of a current value of the brake signal. According to the motor control method of the present invention, the upper limit of the current value of the brake signal is limited so as not to be affected by the variation of the power supply voltage. For this reason, it is always possible to positively and accurately stop the rotation of the motor regardless of a variation of the power supply voltage, by simply detecting the temperature.

Still another object of the present invention is to provide a disk unit comprising a motor rotating a disk, a motor control circuit stopping rotation of the motor rotating in a forward direction when applied with a brake signal for rotating the motor in a reverse direction, temperature detection means for detecting a temperature within the disk unit, and means for limiting an upper limit of a current value of the brake signal, where the motor control circuit includes correction means for correcting a brake signal applying time for which the brake signal is applied to the motor depending on the temperature detected by the temperature detection means. According to the disk unit of the present invention, the upper limit of the current value of the brake signal is limited so as not to be affected by the variation of the power supply voltage. For this reason, it is always possible to positively and accurately stop the rotation of the motor regardless of a variation of the power supply voltage, by simply detecting the temperature.

Other objects and further features of the present invention will be apparent from the following detailed description when read in conjunction with the accompanying drawings.

DESCRIPTION OF THE PREFERRED EMBODIMENTS

Figure 5:
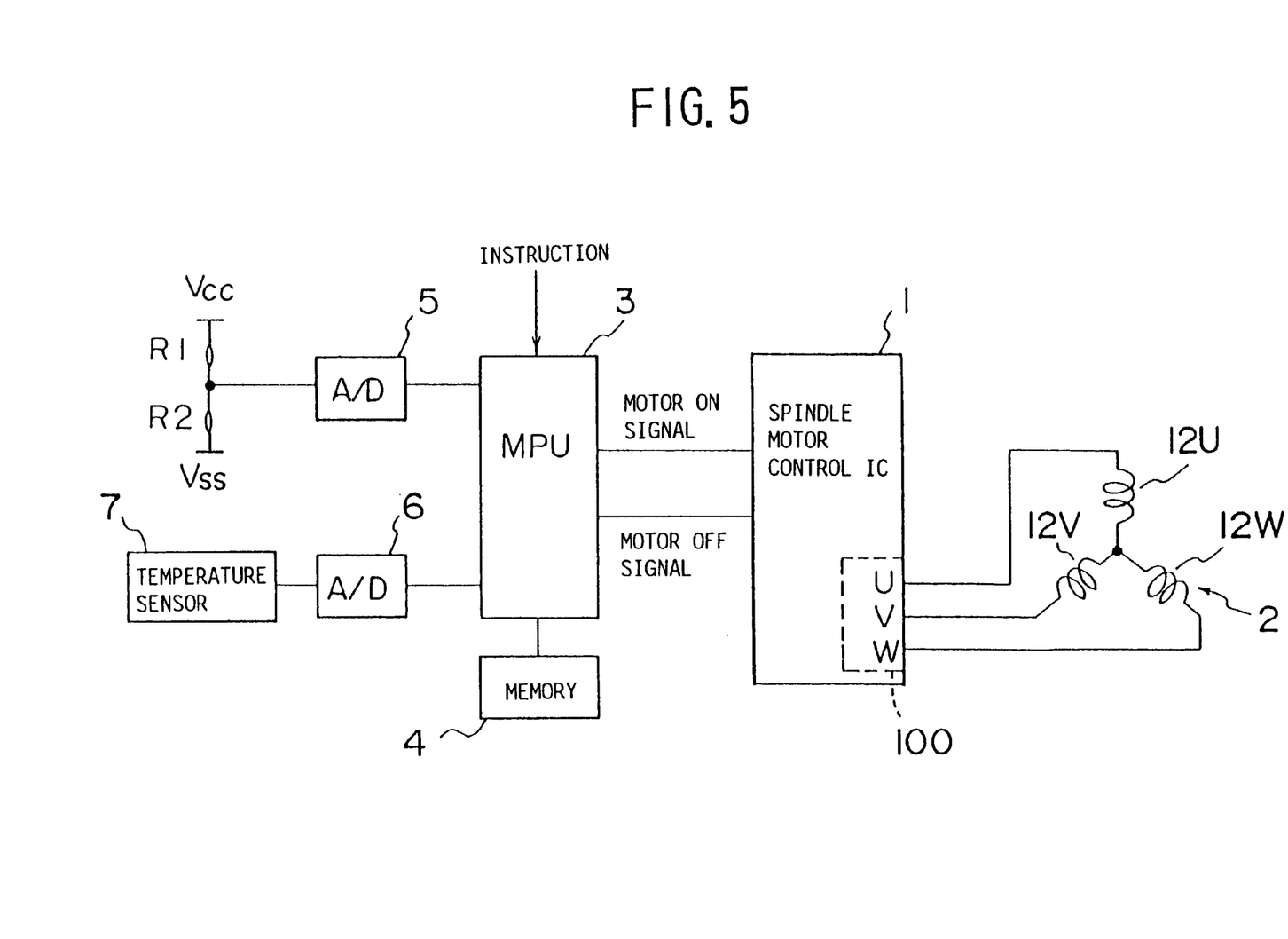
FIG. 5 is a system block diagram showing an embodiment of a disk unit according to the present invention.

FIG. 5 is a system block diagram showing an important part of an embodiment of a disk unit according to the present invention. This embodiment of the disk unit employs an embodiment of a motor control method according to the present invention. In this embodiment of the disk unit, the present invention is applied to an optical disk unit. However, the application of the present invention is not limited to the optical disk unit, and the present invention is similarly applicable to various kinds of disk units including magneto-optic disk units, compact disk (CD) players and digital video disk (DVD) players. The present invention is particularly suited for application to a disk unit which is designed so that a disk is loaded into and unloaded from the disk unit. In addition, the application of the present invention is not limited to a motor which rotates a disk, and the present invention is similarly applicable to a motor control which stops rotation of the motor by applying to the motor which is rotating in a forward direction a brake signal which rotates the motor in a reverse direction.

In FIG. 5, a spindle motor control integrated circuit (IC) 1 controls rotation of a spindle motor 2 which rotates an optical disk (not shown), based on an instruction from a microprocessor unit (MPU) 3. The spindle motor 2 includes windings 12U, 12V and 12W. A memory 4 stores programs of various processes to be executed by the MPU 3 and data.

Resistors R1 and R2 are coupled in series between a power supply voltage line Vcc and a power supply voltage line Vss. A signal voltage from a node which connects the resistors R1 and R2 is input to an analog-to-digital (A/D) converter 5. The resistors R1 and R2 and the A/D converter 5 form a voltage detection means. The A/D converter 5 supplies to the MPU 3 a digital signal corresponding to the detected power supply voltage, and thus, the MPU 3 can recognize a variation in the power supply voltage.

A temperature sensor 7 is provided to detect a surrounding temperature of the spindle motor 2. The location of the temperature sensor 7 within the optical disk unit is not limited to a specific location, however, the temperature sensor 7 is desirably arranged near the spindle motor 2. The temperature sensor 7 supplies a signal corresponding to the detected temperature to an A/D converter 6. The temperature sensor 7 and the A/D converter 6 form a temperature detection means. The A/D converter 6 supplies to the MPU 3 a digital signal corresponding to the detected temperature, and hence, the MPU 3 can recognize a variations in the temperature.

The MPU 3 controls the rotation of the spindle motor 2 via the spindle motor control IC 1 in response to various instructions from a host unit (not shown) or the user. For example, in a read mode in which signals are read from the optical disk, the MPU 3 outputs a motor ON signal in response to a read instruction and controls the spindle motor control IC 1 so as to apply currents to the windings 12U, 12V and 12W so that the spindle motor 2 rotates in the forward direction at a regular rotational speed. In addition, in an eject mode in which the optical disk is unloaded and ejected from the optical disk unit, the MPU 3 outputs a motor OFF signal in response to an eject instruction and controls the spindle motor control IC 1 so as to apply currents (hereinafter referred to as brake signals) to the windings 12U, 12V and 12W so that the spindle motor 2 rotates in the reverse direction.

The motor OFF signal is output from the MPU 3 during a brake time which will be described later, and the brake signals are output from the spindle motor control IC 1 during this brake time. The brake time is determined based on the output signals of the A/D converters 5 and 6. In this embodiment, the brake signal is determined based on the output signals of the A/D converters 5 and 6, however, it is sufficient to determine the brake time based on at least the output signal of the A/D converter 5.

In this embodiment, reference values are obtained in advance by conducting experiments or the like and are stored in the memory 4. The reference values include a brake time tN with respect to a regular power supply voltage VN and a regular temperature TN, a brake time tVH with respect to the regular temperature TN and an upper limit value VH of a tolerable range of the power supply voltage variation, a brake time tVL with respect to the regular temperature TN and a lower limit value VL of the tolerable range of the power supply voltage variation, a brake time tTH with respect to the regular power supply voltage VN and an upper limit value TH of a tolerable range of the temperature variation, and a brake time tHL with respect to the regular power supply voltage VN and a lower limit value TL of the tolerable range of the temperature variation. For example, the regular power supply voltage VN is 5 V, the regular temperature TN is the room temperature of 25° C., and the tolerable range of the power supply voltage variations is ±10% the power supply voltage VN.

In response to the eject instruction from the host unit or the user, the MPU 3 detects a power supply voltage VM based on the output signal of the A/D converter 5 and a temperature TM within the optical disk unit based on the output signal of the A/D converter 6. The MPU 3 obtains a brake time tVM with respect to the detected power supply voltage VM based on the detected power supply voltage VM and the brake time tN with respect to the regular power supply voltage VN and the brake times tVH and tVL with respect to the upper and lower limit values VH and VL of the tolerable range of the power supply voltage variation stored in the memory 4, using the following formulas (1) and (2).

$$(VM-VN)/(tVM-tN)=(VH-VN)/(tVH-tN) \quad (1)$$

$$(VM-VN)/(tVM-tN)=(VL-VN)/(tVL-tN) \quad (2)$$

In addition, the MPU 3 obtains a brake time tTM with respect to the detected temperature TM based on the detected temperature TM and the brake time tN with respect to the regular temperature TN and the brake times tTH and tTL with respect to the upper and lower limit values TH and TL of the tolerable range of the temperature variation stored in the memory 4, using the following formulas (3) and (4).

$$(TM-TN)/(tTM-TN)=(TH-TN)/(tTH-tN) \quad (3)$$

$$(TM-TN)/(tTM-tN)=(TL-TN)/(tTL-tN) \quad (4)$$

Furthermore, the MPU 3 obtains an average of the brake time tVM and the brake time tTM obtained based on the formulas (1) through (4) described above using the following formula (5), so as to obtain a brake time tM with respect to the present environmental conditions.

$$tM=(tVM+tTM)/2 \quad (5)$$

The MPU 3 supplies the motor OFF signal to the spindle motor control IC 1 during the brake time tM which is obtained in the above described manner. Hence, the spindle motor control IC 1 applies the brake signals to the spindle motor 2 during this brake time tM. As a result, it is always possible to positively and accurately stop the rotation of the spindle motor 2 within a short time in response to the eject instruction, without the need to provide a motor rotation detection means and regardless of the environment in which the spindle motor 2 is used.

The MPU 3 automatically sets the brake time tM similarly to the above in response to an instruction other than the eject instruction if this other instruction instructs a mode which requires the spindle motor 2 to stop or this other instruction is a spindle stop instruction. Accordingly, in response to such an instruction, the MPU 3 also controls the spindle motor control IC 1 so that the brake signals are applied to the spindle motor 2 during the brake time tM.

Figure 6:
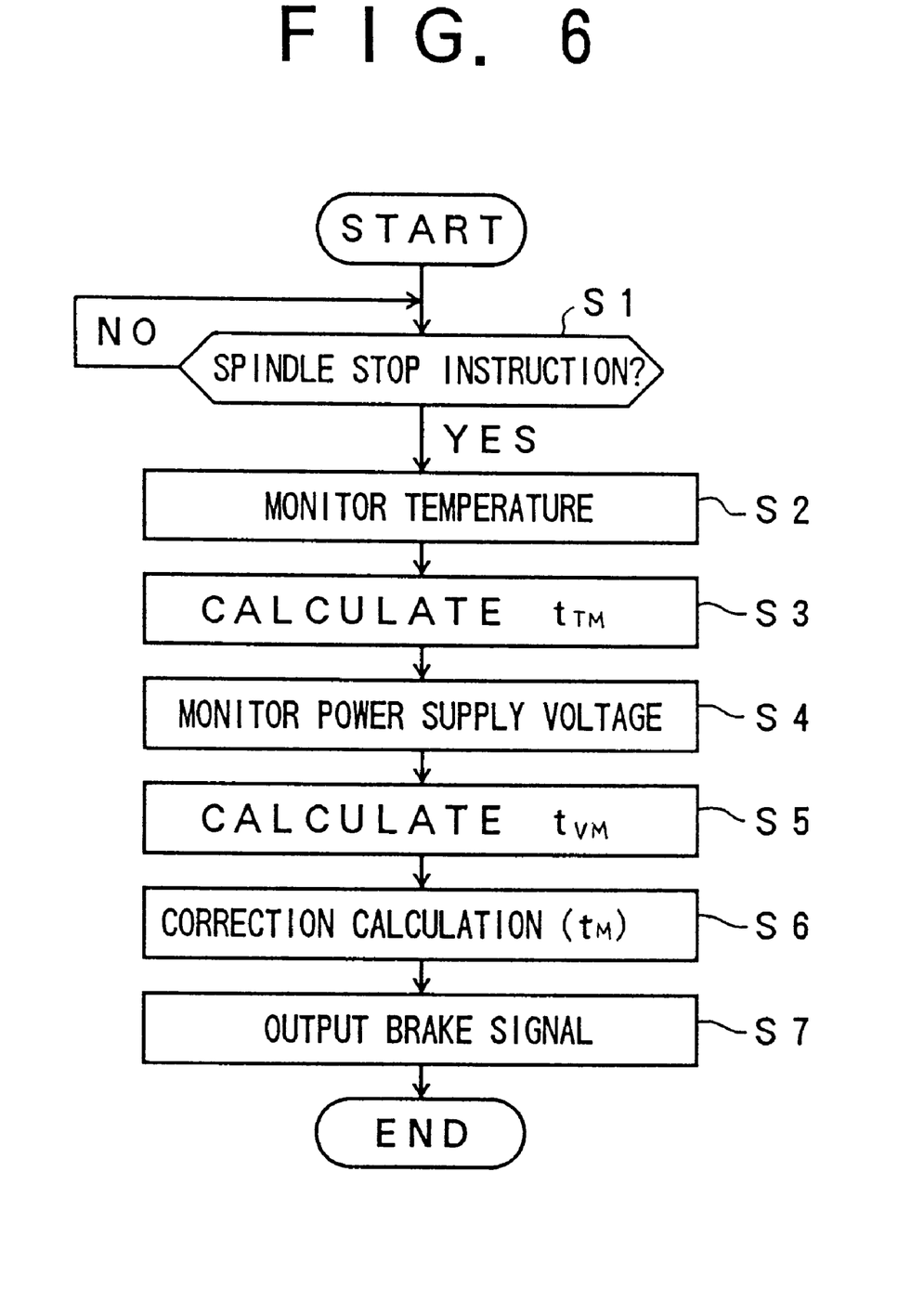
FIG. 6 is a flow chart for explaining a first embodiment of a brake time setting process of a microprocessor unit.

FIG. 6 is a flow chart for explaining a first embodiment of a brake time setting process of the MPU 3. In this embodiment, the present power supply voltage VM and temperature TM are detected in response to the spindle stop instruction.

In FIG. 6, a step S1 decides whether or not the spindle stop instruction is input from the host unit or the user, and the process advances to a step S2 if the decision result in the step S1 becomes YES. The step S2 monitors the present temperature TM based on the output signal of the A/D converter 6, and a step S3 calculates the brake time tTM based on the formula (3) or (4) described above, using the data read from the memory 4. A step S4 monitors the present power supply voltage VM based on the output signal of the A/D converter 5, and a step S5 calculates the brake time tVM based on the formula (1) or (2) described above, using the data read from the memory 4. A step S6 carries out a correction calculation based on the formula (5), and obtains the brake time tM with respect to the present environmental conditions. A step S7 inputs the brake signals to the spindle motor control IC 1 during the brake time tM, and the process ends.

In this case, the memory 4 may be formed by a read only memory (ROM).

Figure 7:
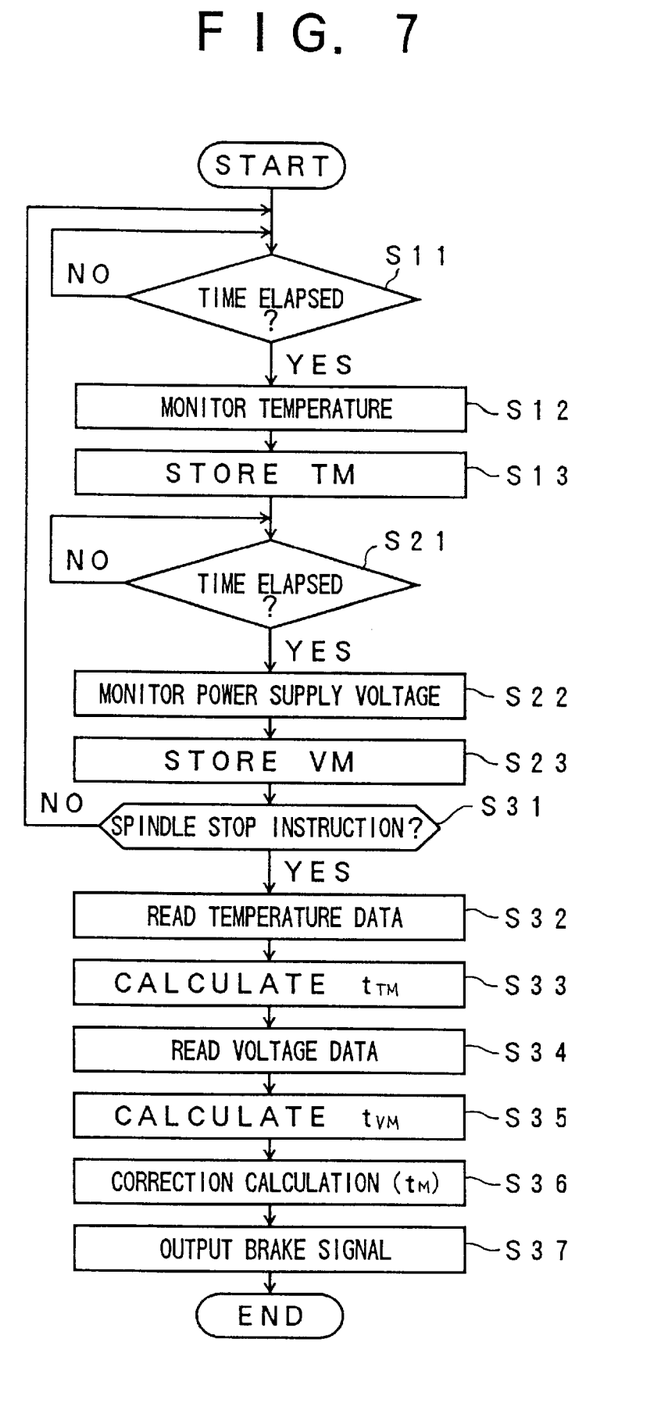
FIG. 7 is a flow chart for explaining a second embodiment of the brake time setting process of the microprocessor unit.

FIG. 7 is a flow chart for explaining a second embodiment of the brake time setting process of the MPU 3. In this embodiment, the present power supply voltage VM and temperature TM are detected at arbitrary cycles.

In FIG. 7, a step S11 decides whether or not a predetermined time set in a temperature monitoring timer has elapsed, and the process advances to a step S12 if the decision result in the step S11 becomes YES. The step S12 monitors the present temperature TM based on the output signal of the A/D converter 6, and a step S13 stores the monitored temperature TM in the memory 4. A step S21 decides whether or not a predetermined time set in a power supply voltage monitoring timer has elapsed, and the process advances to a step S22 if the decision result in the step S21 becomes YES. The step S22 monitors the present power supply voltage VM based on the output signal of the A/D converter 5, and a step S23 stores the monitored power supply voltage VM in the memory 4.

In this case, the memory 4 may be formed by a ROM which prestores the data described above, and a random access memory (RAM) which temporarily stores the present temperature TM and power supply voltage VM.

A step S31 decides whether or not the spindle stop instruction is input from the host unit or the user, and the process advances to a step S32 if the decision result in the step S31 becomes YES. The step S32 reads the data of the temperature TM from the memory 4, and a step S33 calculates the brake time tTM based on the formula (3) or (4) described above. A step S34 reads the data of the power supply voltage VM from the memory 4, and a step S35 calculates the brake time tVM based on the formula (1) or (2) described above. A step S36 carries out a correction calculation based on the formula (5) described above, and obtains the brake time tM with respect to the present environmental conditions. A step S37 inputs the brake signals to the spindle motor control IC 1 during the brake time tM, and the process ends.

Next, a description will be given of a modification of this embodiment of the disk unit described above. In this modification, a current limiting circuit 100 having a known construction is provided within the spindle motor control IC 1 shown in FIG. 5, so as to limit the upper limit value of the currents applied to the spindle motor 2. If the regular power supply voltage VN is 5 V, the current limiting circuit 100 limits the currents applied to the windings 12U, 12V and 12W so that the upper limit value of the currents applied to the spindle motor 2 becomes the maximum current value which flows when the power supply voltage is 4.5 V, for example.

According to this modification, the upper limit value of the currents applied to the spindle motor 2 is limited regardless of the variation of the power supply voltage. For this reason, it is unnecessary to detect the power supply voltage in this modification, and the correction calculation described above may be carried out based solely on the result of the temperature detection.

Figure 8:
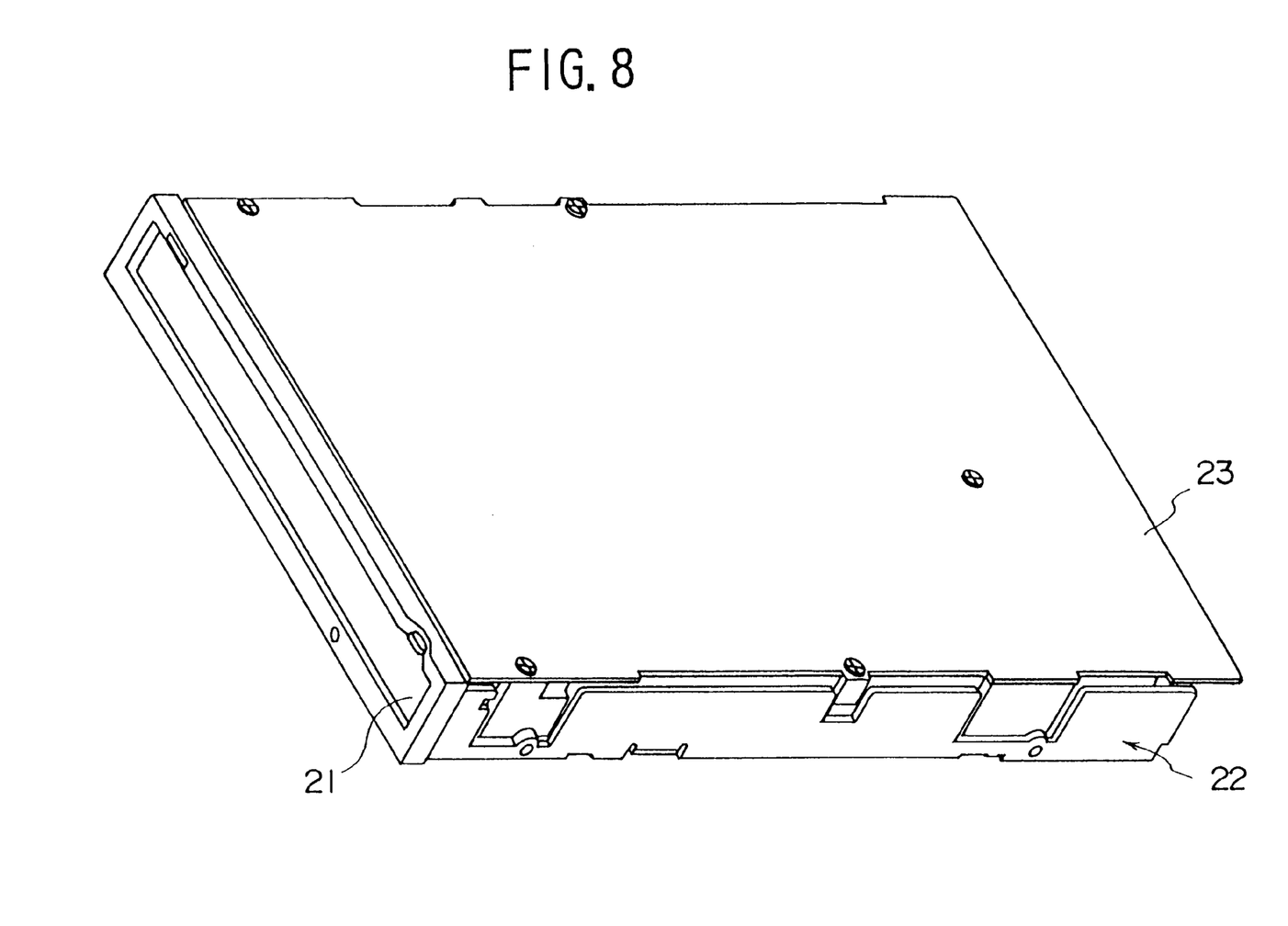
FIG. 8 is a perspective view showing the external appearance of an optical disk unit.

FIG. 8 is a perspective view showing the external appearance of the optical disk unit. In FIG. 8, the optical disk unit includes a housing 22 provided with an opening 21 through which the optical disk is loaded into and unloaded from the optical disk unit, and a top cover 23 provided on top of the housing 22.

Figure 9:
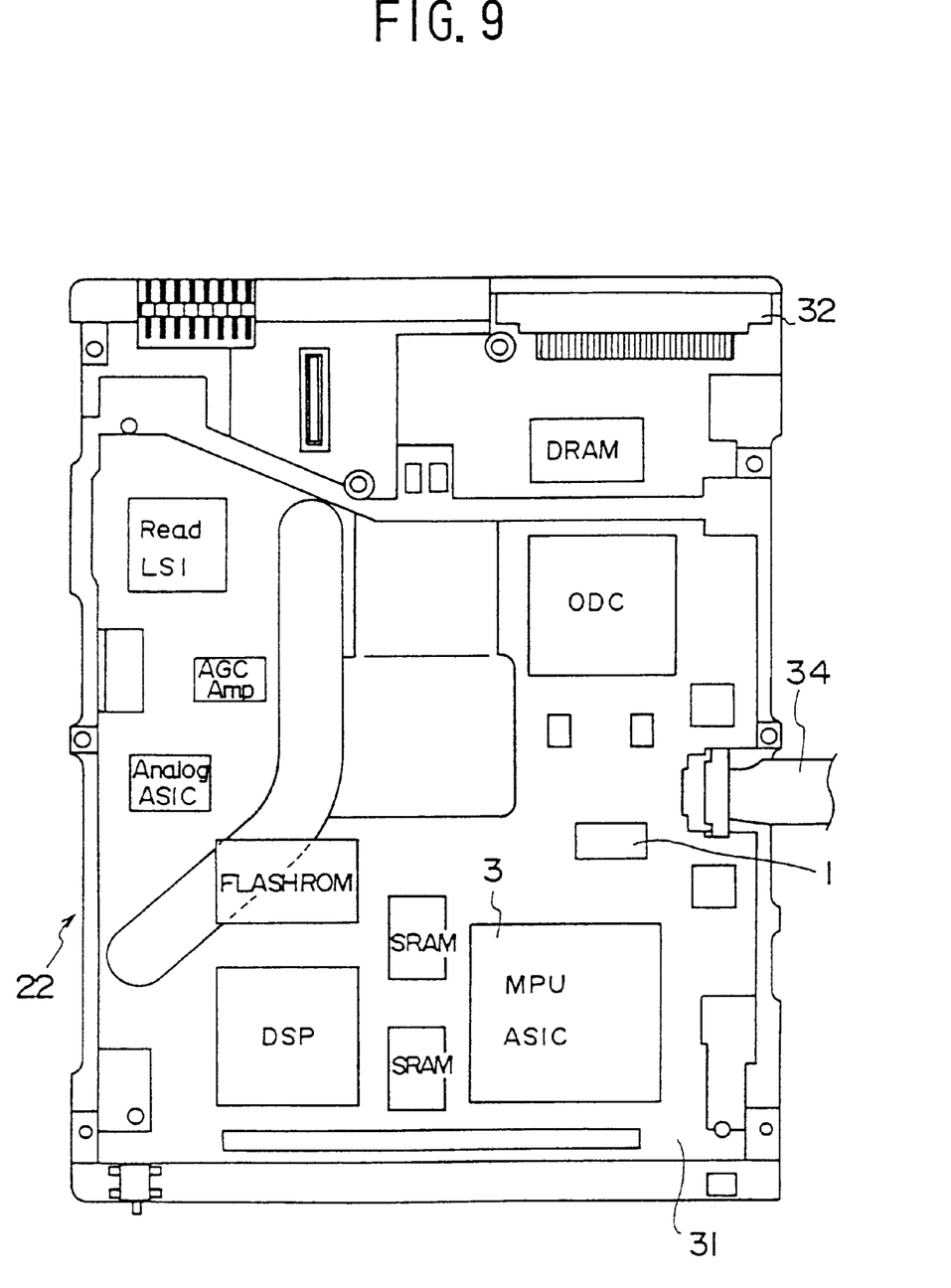
FIG. 9 is a plan view showing the optical disk unit in a state where a top cover is removed.

FIG. 9 is a plan view showing the optical disk unit in a stage where the top cover 23 is removed. In FIG. 9, the spindle motor control IC 1, the MPU 3 and the like are provided on a circuit board 31. In addition, an interface (I/F) connector 32 is provided on the housing 22. This interface connector 32 is connectable to an external unit, and for example, the instruction from the host unit is input to the MPU 3 via the interface connector 32. In addition, a flexible printed circuit (FPC) 34 which is connectable to the external unit is connected to the circuit board 31. For example, control signals related to moving of a carriage of an optical system and the like are input from the host unit to a driving system of the carriage via the FPC 34.

Figure 10:
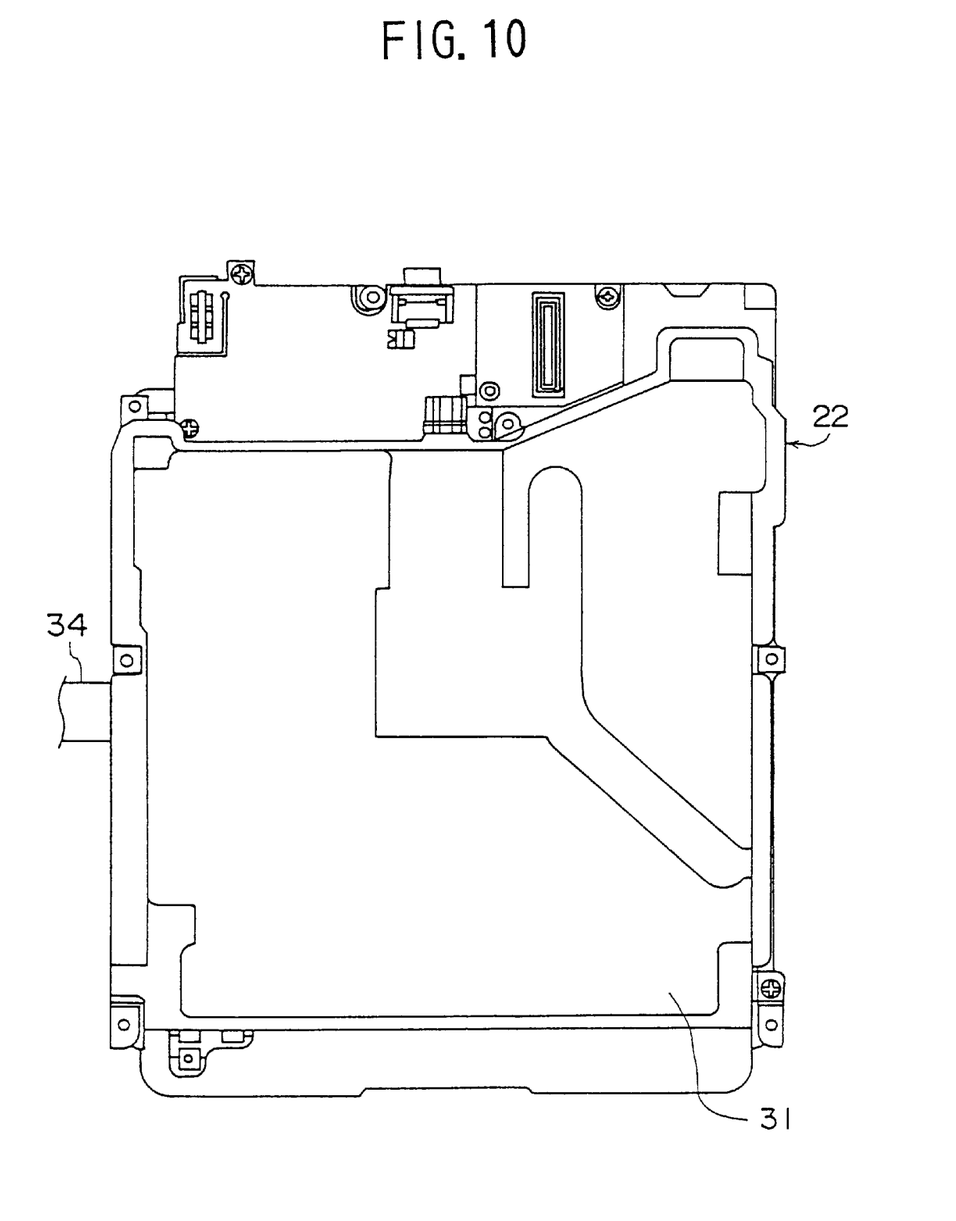
FIG. 10 is a diagram showing a circuit board shown in FIG. 9 from a rear thereof.

FIG. 10 is a diagram showing the circuit board 31 shown in FIG. 9 viewed from a rear thereof.

Figure 11:
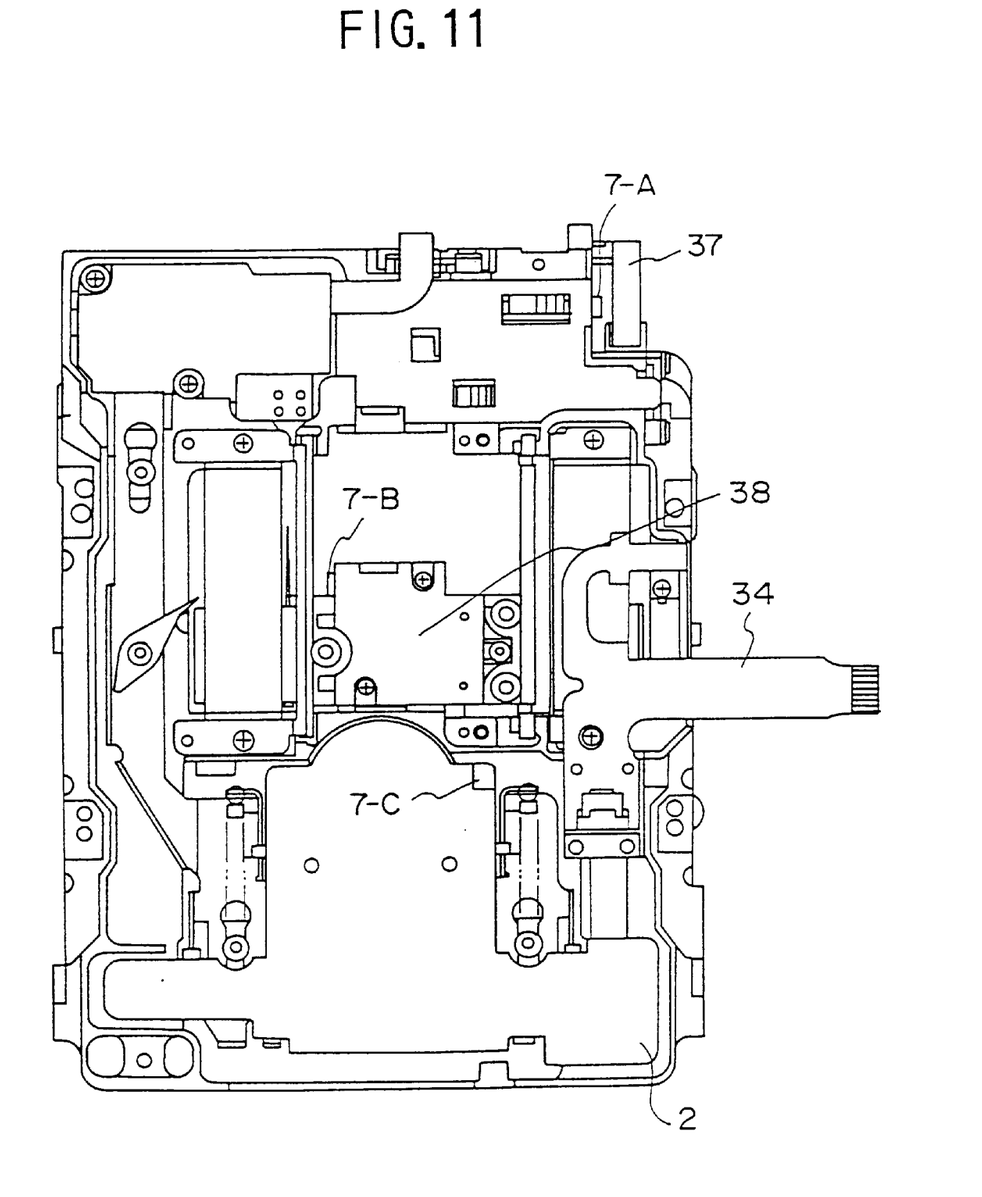
FIG. 11 is a bottom view showing the optical disk unit in a state where a lower cover is removed.

Further, FIG. 11 is a bottom view showing the optical disk unit in a state where a lower cover is removed. The spindle motor 2 is provided at a lower portion in FIG. 11. A laser diode (LD) 37 which is used as a light source for irradiating a light beam on the optical disk is provided at a top right portion in FIG. 11. A carriage 38 of the optical system is provided at a central portion in FIG. 11.

For example, the temperature sensor 7 shown in FIG. 5 is provided at a position 7-A in FIG. 11. In this case, the temperature sensor 7-A can be used in common as a sensor which detects the temperature of the laser diode 37. Hence, it is unnecessary to provide independent sensors exclusively for detecting the temperature of the laser diode 37 and the temperature in the vicinity of the spindle motor 2, and both the number of parts and the cost of the optical disk unit can be reduced in this case. In addition, if the temperature sensor 7 is provided at a position 7-B in FIG. 11, the temperature sensor 7-B can be used in common as a sensor which is originally provided to detect the temperature of the optical disk. Thus, it is unnecessary to provide independent sensors exclusively for detecting the temperature of the optical disk and the temperature in the vicinity of the spindle motor 2, and both the number of parts and the cost of the optical disk unit can be reduced in this case.

The temperature sensor 7 may also be provided at a position 7-C in FIG. 11. In this case, the temperature sensor 7-C is provided in a vicinity of the spindle motor 2, and for this reason, the temperature in the vicinity of the spindle motor 2 can be detected more accurately.

A time for which the brake signals are applied to the spindle motor 2 may be measured in advance for various power supply voltages and temperatures, and a table of measured power supply voltages and temperatures may be prestored in the memory 4. In this case, a reference to the table stored in the memory 4 can be made based on the detected power supply voltage or temperature, and the time for which the brake signals are applied to the spindle motor 2 may be corrected depending on the values read from the table stored in the memory 4.

Further, the present invention is not limited to these embodiments, but various variations and modifications may be made without departing from the scope of the present invention.

What is claimed is:

1. A motor control method for stopping rotation of a motor which rotates in a forward direction by applying a brake signal for rotating the motor in a reverse direction, said motor control method comprising the steps of:
   (a) detecting a power supply voltage; and
   (b) correcting a brake signal applying time for which the brake signal is applied to the motor depending on the power supply voltage detected by said step (a), without monitoring a rotating direction of the motor and a rotating velocity.

2. The motor control method as claimed in claim 1, wherein said step (a) detects the power supply voltage at arbitrary cycles.

3. The motor control method as claimed in claim 1, wherein said step (a) detects the power supply voltage in response to a brake instruction.

4. The motor control method as claimed in claim 1, which further comprises the steps of:
   (c) detecting a temperature within a disk unit which includes the motor,
   said step (b) correcting the brake signal applying time depending on the power supply voltage detected by said step (a) and the temperature detected by said step (c).

5. The motor control method as claimed in claim 4, wherein said step (c) detects the temperature at arbitrary cycles.

6. The motor control method as claimed in claim 4, wherein said step (c) detects the temperature in response to a brake instruction.

7. The motor control method as claimed in claim 4, wherein said step (b) obtains a first brake signal applying time with respect to the detected power supply voltage and a second brake signal applying time with respect to the detected temperature independently, and sets an average value of the first and second brake signal applying times as said brake signal applying time.

8. A disk unit comprising:

a motor rotating a disk in a forward direction;

a motor controller which stops rotation of said motor with a brake signal for rotating said motor in a reverse direction; and a voltage detector which detects a power supply voltage, said motor controller for correcting a brake signal applying time for which the brake signal is applied to said motor depending on the power supply voltage detected by said voltage detector, without monitoring a rotating direction of said motor and a rotating velocity.

9. The disk unit as claimed in claim 8, wherein said voltage detector detects the power supply voltage at arbitrary cycles.

10. The disk unit as claimed in claim 8, wherein said voltage detector detects the power supply voltage in response to a brake instruction means.

11. The disk unit as claimed in claim 8, which further comprises:

a temperature detector which detects a temperature within the disk unit, said motor controller correcting the brake signal applying time depending on the power supply voltage detected by said voltage detector and the temperature detected by said temperature detector.

12. The disk unit as claimed in claim 11, wherein said temperature detector detects the temperature at arbitrary cycles.

13. The disk unit as claimed in claim 11, wherein said temperature detector detects the temperature in response to a brake signal.

14. The disk unit as claimed in claim 11, wherein said motor controller obtains a first brake signal applying time with respect to the detected power supply voltage and a second brake signal applying time with respect to the detected temperature independently, and sets an average value of the first and second brake signal applying times as said brake signal applying time.

15. A motor control method for stopping rotation of a motor which rotates in a forward direction by applying a brake signal for rotating the motor in a reverse direction, said motor control method comprising the steps of:

(a) detecting a temperature in a unit which includes the motor;

(b) correcting a brake signal applying time for which the brake signal is applied to the motor depending on the temperature detected by said step (a), without monitoring a rotating direction of the motor and a rotating velocity; and (c) limiting an upper limit of a current value of the brake signal.

16. The motor control method as claimed in claim 15, wherein said step (a) detects the temperature at arbitrary cycles.

17. The motor control method as claimed in claim 15, wherein said step (a) detects the temperature in response to a brake instruction.

18. A disk unit comprising:

a motor rotating a disk;

a motor controller which stops rotation of said motor rotating in a forward direction when applied with a brake signal for rotating said motor in a reverse direction; and a temperature detector which detects a temperature within the disk unit;

said motor controller correcting a brake signal applying time for which the brake signal is applied to said motor depending on the temperature detected by said temperature detector without monitoring a rotating direction of said motor and a rotating velocity.

19. The disk unit as claimed in claim 18, wherein said temperature detector detects the temperature at arbitrary cycles.

20. The disk unit as claimed in claim 18, wherein said temperature detector detects the temperature in response to a brake instruction.

* * * * *

UNITED STATES PATENT AND TRADEMARK OFFICE
CERTIFICATE OF CORRECTION

PATENT NO. : 6,046,559
DATED : April 4, 2000
INVENTOR(S) : Iwasaki

It is certified that error appears in the above-indentified patent and that said Letters Patent is hereby corrected as shown below:

In the Claims:

In claim 10, line 3, delete "means"

Signed and Sealed this

Twenty-ninth Day of May, 2001

Attest:

NICHOLAS P. GODICI

*Attesting Officer*      *Acting Director of the United States Patent and Trademark Office*